(12) United States Patent
Riedl

(10) Patent No.: US 6,230,367 B1
(45) Date of Patent: May 15, 2001

(54) HANDLE ASSEMBLY FOR HAND-HELD TOOL

(75) Inventor: Reinhard Riedl, Finning (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/452,301

(22) Filed: Dec. 1, 1999

(30) Foreign Application Priority Data

Dec. 7, 1998 (DE) .............................................. 198 56 266

(51) Int. Cl.$^7$ ................................ B25G 3/00; B25G 3/10
(52) U.S. Cl. .......................... 16/436; 16/422; 173/162.2; 173/170
(58) Field of Search ............................ 16/422, 428, 436; 81/436, 489, 177.1; 173/162.2, 162.1, 170; 294/1.1, 74; 248/49, 58, 59–63; 224/271, 929, 930

(56) References Cited

U.S. PATENT DOCUMENTS

| | | | |
|---|---|---|---|
| 4,247,140 | * 1/1981 | Gordon | 294/26 |
| 4,369,487 | * 1/1983 | Carlow | 362/258 |
| 5,172,773 | * 12/1992 | Meister et al. | 173/170 |
| 5,810,225 | * 9/1998 | Andrew | 248/77 |

\* cited by examiner

Primary Examiner—Chuck Y. Mah
(74) Attorney, Agent, or Firm—Brown & Wood, LLP

(57) ABSTRACT

A handle assembly for a hand-held tool and including a handle (1) connectable with the tool housing and having a through-bore (4) for a cable (40) connecting the tool with a power source, a hook-shaped device (11) for suspending the tool and having an element for securing the suspending device on the cable (40) at any arbitrary position on the cable without a possibility of slippage of the suspending device along the cable, and a connection element adjoining the through-bore (4) of the handle (1) for connecting the suspending device (11) with the handle (1).

12 Claims, 2 Drawing Sheets

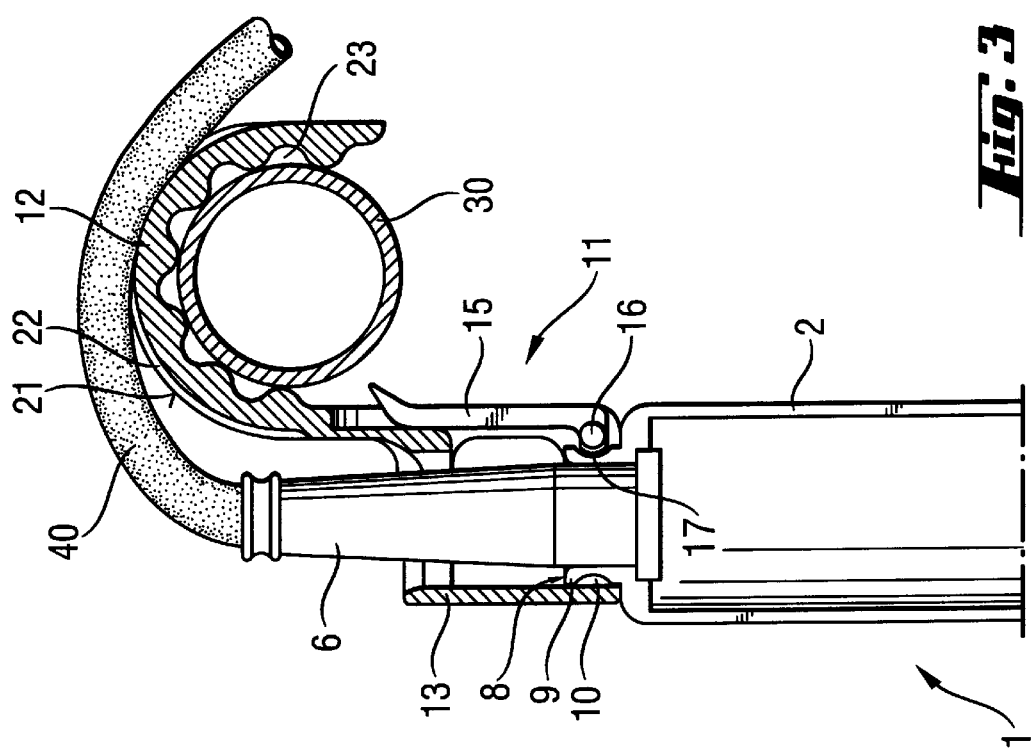
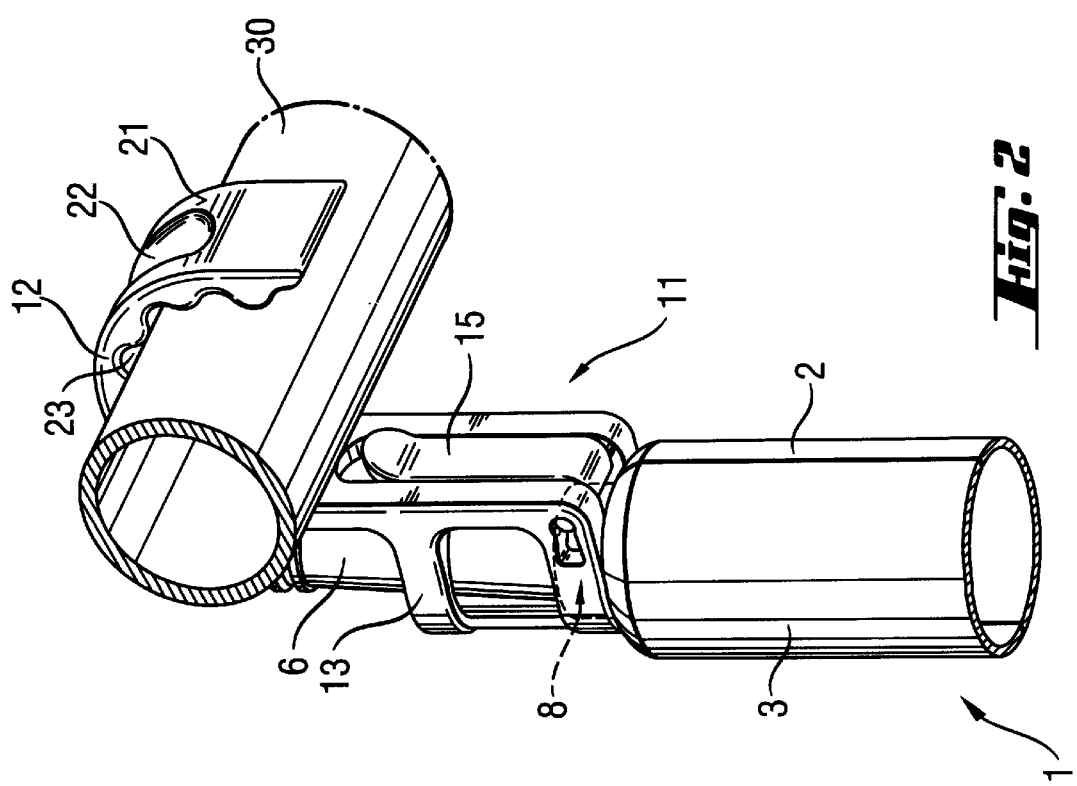

HANDLE ASSEMBLY FOR HAND-HELD TOOL

BACKGROUND OF THE INVENTION

1. Field of the Invention

The present invention relates to electrically driven hand-held or manual tool, in particular, to an electrical screwdriver and/or drilling tool having a drive spindle rotatably supported in the tool housing and rotatable by an electrical drive motor likewise arranged in the tool housing, and more particularly, to a handle assembly for such a hand-held tool and including a handle connectable with the tool housing and having a through-bore for cable connecting the tool with a power source.

2. Description of the Prior Act

Electrically driven hand-held or manual tool, in particular electrical screwdrivers, drilling tools, combination tools and the like, all includes an electrical cable which usually extends through an opening formed in the handle region. For protection of the cable, there are provided antikink sockets which are usually secured in the guide opening for the cable between the tool housing and the handle shells. Constant kink movements, to which the cable is subjected during the operation of the tool can result, despite the presence of the antikink socket, in rupture of the cable strands. This leads to the stoppage of the tool and necessitates replacement of the cable.

During the use of an electrically driven tool, e.g., an electrical screwdriver or a drilling tool, it is necessary from time to time to put the tool aside so that both hands can be used for other tasks. Also during mounting works performed on a scaffold or on a ladder, it is often necessary to leave the scaffold or the ladder for a short time, e.g., to fetch additional screws or to place the ladder in a desired position. To this end, on many occasions, the electrical cable of the electrical screwdrivers or of the drilling tool is wound around a strut of the scaffold or the ladder. It is clear that these measures are unacceptable and increase the danger of the cable being damaged.

Accordingly, an object of the present invention is to so improve an electrically driven hand-held tool that can safely be put aside.

Another object of the present invention is to reduce the possibility of the power of supply cable being damaged.

SUMMARY OF THE INVENTION

These and other objects of the present invention, which will become apparent hereinafter, are achieved by providing a handle assembly for a hand-held tool and including a handle connectable with the tool housing and having a through-bore for the cable connecting the tool with the power source, a hook-shaped device for suspending the tool and having means for securing the suspending device on the cable at any arbitrary position on the cable without a possibility of slippage of the suspending device along the cable, and connection means adjoining the through-bore of the handle for connecting the suspending device with the handle.

The connection element, which adjoins the through-bore for the power cable and is provided on the outer side of the handle, provides for attachment to the housing and, in particular, to the handle of hook-shaped suspending device securable on the cable at any arbitrary location, without slippage along the cable. The suspending device which is releasably attached to the housing or the handle, performs two functions. On one hand, it enables, when necessary, to hang the tool on a scaffold strut or a peg. On the other hand, it protects the cable. The movements, which are generated during the tool operation, do not result in buckling of the cable because it is supported on the outer surface of the hook-shaped suspending device and is not subjected to sharp snaps. The hook-shaped suspending device is retained on the cable without a possibility of slippage and can be secured at any arbitrary position of the cable. This also makes it possible to secure the suspending device between the tool handle and the connector plug. In this case, the suspending device permits to suspend the cable at a suitable location. This, e.g., is desired to prevent the cable from being located in a puddle. Because the suspending device is retained without slippage and can easily be displaced along the cable, it can, in case the tool is placed into a transporting box that has rather tight dimensions and is sized primarily in accordance with the dimensions of the tool housing, be displaced to a location on the cable that permits to place the tool into the transporting box without any problem. After removing the tool from the transporting box, the suspending device can again be displaced so that it can be connected with the connection element on the handle.

According to an advantageous embodiment of the present invention, the suspending device has a hook and a substantially cylindrical connecting member adjoining the hook and having a guide opening for the cable. The inner diameter of the guide opening can be reduced with a clamping lever. The clamping lever is supported on the connecting member and has an eccentric member that projects into the guide opening. The so formed suspending device can be held and operated with one hand. It can be secured at any point on the cable with the clamping lever. The eccentric member reduces the inner diameter of the guide opening by an amount sufficient to hold the suspending device against slippage, e.g., by the weight of the drooping cable. On the other hand, the clamping force is not large enough to cause any damage of the cable in the region in which the suspending device is secured to the cable. At a larger load, e.g., generated by pulling the cable, at the same retaining force, the suspending device can displace, despite being clamped. Thereby, it is insured that the tool can be suspended by the suspending device only then when the connecting member is fixedly connected with the connection element provided on the handle. Thereby, dropping of the tool by the cable, which is suspended with the attached suspending device, is prevented.

In a particular simple embodiment of the suspending device, the eccentric member is arranged on the pivot axle of the clamping lever. The pivot axle of the clamping lever is displaceable on the connecting member of the suspending device in two support positions which extend into the guide opening at different degrees. Both support positions are connected by a displacement slot that, preferably, has a smaller width than the axle retainers of the pivot axle. Thereby, the axle retainers cannot automatically become loose. By displacing the pivot axle from the outer support position into the further projecting inner support position, the inner diameter of the guide opening can be reduced along a larger part of its circumference. This permits to easily adapt the clamping element to different diameters along the cable, e.g., for connecting the suspending device with the connection element on the handle. In the region of the ani-kink socket, a smaller reduction of the inner diameter of the guide opening is necessary than in other positions on the cable where the cable diameter is smaller.

The hook of the suspending device has an outer surface provided with a cavity-shaped depression which extends from the adjoining connecting member along a larger portion of the longitudinal extent of the hook. The cavity-shaped depression forms a guide for the cable which is supported on the suspending device. Thereby, during a normal operation of the tool, the cable is displaced together with the tool in case of possible relative horizontal swings of the tool. This prevents kinking movements of the cable. For a better attachment of the hook, e.g., on a scaffold strut or on a peg, groove-shaped depressions, which extend substantially transverse to the longitudinal extent of the hook, are provided on the hook inner surface.

In a particularly advantageous embodiment of the present invention, the hook of the suspending device has a variable bearing width. To this end, the hook can be made as a telescopic member. In an alternative embodiment of the invention, the hook can have a variable curvature. To this end, the hook can be divided in separate segments connected by locking joints. Alternatively, the hook can be made of a plastic material deformable upon application of a minimal force.

The connection element provided on the handle, can be formed e.g., as a dovetail guide cooperating with complimentary element or elements provided on the suspending device. In a particular simple and cost-effective embodiment of the present invention, the connection element is formed by a substantially cylindrical collar which limits the guide opening for the cable and which projects from the outer surface of the handle. Advantageously, the collar is formed integrally with the handle shells. For fixing the suspending device on the tool housing, its connecting member is pushed over the collar and is releasably secured thereto with the clamping lever.

According to an advantageous embodiment of the present invention, on the outer side of the collar, there are provided depressions which are arranged at a predetermined angular distance from each other along the circumference of the collar, e.g., at an angle of 60° or 90°. The depression serve for formlockingly receiving an eccentric member which is provided on the clamping lever. The depressions provide for securing the suspending device in a predetermined angular position on the handle.

When a circular groove is provided on the outer surface of the collar for formlockingly receiving the eccentric element or member provided on the clamping lever, the suspending device can be secured on the handle or any arbitrary angular position as it can be rotated relative to the handle.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 2. a perspective view of a handle of the manual tool shown in FIG. 1 with an attached suspending device; and FIG. 3 a cross-sectional view of the handle with an attached suspending device.

DETAILED DESCRIPTION OF THE PREFERRED EMBODIMENT

Figure 1:
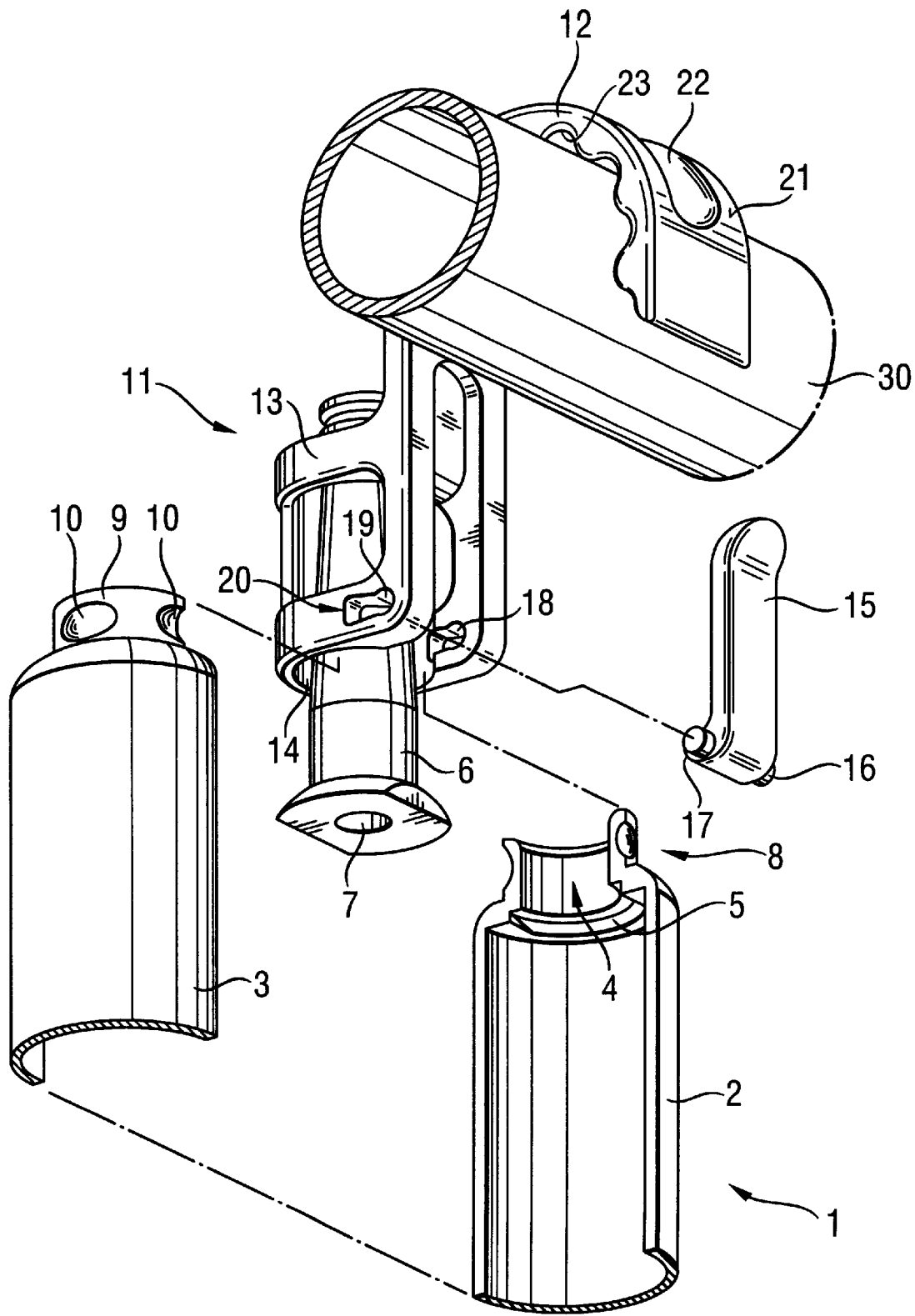
FIG. 1 an exploded perspective view of essential for the present invention components of a manual tool according to the present invention.

In FIGS. 1–3, a handle of an electrically driven manual tool, e.g., of an electrical screwdriver and/or drilling tool, which is not shown in detail, is designated with a reference numeral 1. The handle 1 can, e.g., be formed integrally with the tool housing. On many occasions, the handle 1 is formed as a separate component or part which is screwed to the tool housing. Different embodiments of handles of manual or hand-held tools are known since long age. Therefore, the following discussion would be limited only to the discussion of essential components necessary for understanding of the present invention.

The handle 1, which is shown in the drawings, usually is formed of two shells 2 and 3 which are provided with complementary recesses that form, in an assembled condition, a through-opening 4 for a cable 40 which connects the tool with a source of electrical power (see FIG. 3) and which is guided primarily in an antikink socket 6. The antikink socket 6, which is provided with a bore 7 for the cable 40, is formlockingly retained in retaining grooves 5 formed in the shells 2 and 3. In the region of the through-opening 4, semi-cylindrical projections extend from the shells 2,3. In the assembled condition of the shells 2,3, the projection form a cylindrical collar 9 which surrounds the throughopening 4.

The cylindrical collar 9 forms a connection element 8 for a suspending device 11 that consists essentially of a hook 12 and a connecting member 13 that adjoins the hook 12. The connecting member 13 has a guide opening 14 for the antikink socket 6 or the cable 40. The inner diameter of the guide opening 14 is so selected that the suspending device 11 can be easily displaced, if necessary, along the cable 40 while still being retained without slipping along the cable 40. For retaining the suspending device 11, the frame-shaped cylindrical connecting member 13 has paired opposite recessed support positions 18, 19 in which a pivot axle 16 of a clamping lever 15 is supported. The support positions 18, 19 are so shaped that displacement of the pivot axle 16 in the cross-section of the guide opening 14 to a greater or less degree is insured. The clamping lever 15 provides for securing the suspending device 11 in any arbitrary position along the cable 40 as well as for securing of the collar 9 which should have a larger inner diameter than the outer diameter of the cable 40 in order to accommodate the antikink socket 6. The opposite support positions 18, 19 are connected with each other by a displacement slot 20. The slot width is somewhat smaller than the outer diameter of the axle retainers. Therefore, the axle 16 cannot slip automatically.

On the outer side of the collar 9, there are provided depressions 10 arranged at a predetermined angular distance from each other along the circumference of the collar 9, e.g., at an angle of 60° or 90°. The depressions 19 serve for formlockingly receiving an eccentric member 17 provided on the pivot axle 16 of the clamping lever 15. The depressions 10 insure that the suspending device 11 is secured on the handle 1 in a predetermined angular position relative thereto. Instead of the depressions, an angular groove can be provided on the outer surface of the collar 9. In the later case, the suspending device 11 can be secured on the handle 1 at any arbitrary angular position in accordance with a desired orientation of the hook 12. A cavity-like depression 22 is provided in the outer surface 21 of the hook 12. The cavity-like depression 22 extended from the cylindrical connecting member 13 over a larger portion of the longitudinal extent of the outer surface 21 of the hook 12. The cavity-like depression 22 provides for better guidance and support of the cable 40, as shown in FIG. 3.

The hook 12 of the suspending device 11 is suspended from a peg or a strut of scaffold or the like. Such a peg or a strut is designated in FIGS. 1–3 with a reference numeral 30. To provide for a better retention of the hook 12, groove-shaped depressions 23 are formed in the inner surface of the hook 12. The groove-shaped depressions 23 extend substantially transverse to the longitudinal extent of the hook 12. The groove-shaped depressions 23 improve the retention of the suspending device by meshing with available unevennesses, or with appropriate elevations formed on the peg or strut, or with another complementary means. The groove-like depressions 23 permit to suspend the suspending device, e.g., from a rail or a ring having a smaller diameter than the hook depth, and prevent falling of the manual tool. In another embodiment of the present invention, not shown in drawings, the hook width of the hook is made adjustable which permits to adapt it to the existing conditions. E.g., to this end, the hook can be formed as a telescopic part. In another embodiment, the hook is formed of separate parts connected with each other by locking links. Finally, the hooks can be formed of a plastically deformable material which can be deformed by an application of a minimal force which is larger than the weight of the suspended manual tool.

Though the present invention was shown and described with references to the preferred embodiments, various modifications thereof will be apparent to those skilled in the art and, therefore it is not intended that the invention be limited to the disclosed embodiments or details thereof, and departure can be made therefrom within the spirit and scope of the appended claims.

What is claimed is:

1. A handle assembly for a hand-held tool having a housing, comprising a handle (1) connectable with the tool housing and having a through-bore (4) for a cable (40) connecting the tool with a power source; a hook-shaped device (11) for suspending the tool and having means for securing the suspending device on the cable (40) at any arbitrary position on the cable without a possibility of slippage of the suspending device along the cable; and connection means adjoining the through-bore (4) of the handle (1) for connecting the suspending device (11) with the handle (1).

2. A handle assembly as set forth in claim 1, wherein the suspending device (11) has a hook (12), and a substantially cylindrical connecting member (13) having a guide opening (14) for the cable (40) and adjoining the hook (12).

3. A handle assembly as set forth in claim 2, wherein the suspending device (11) comprises a clamping lever (15) for reducing an inner diameter of the guide opening (14) of the connecting member (13), and wherein the clamping lever (15) is supported on the connecting member (13) and has an eccentric member (17) projecting into the guide opening (14).

4. A handle assembly as set forth in claim 3, wherein the suspending device (11) further comprises a pivot axle (16) for supporting the clamping lever (15) on the connecting member (13), and wherein the eccentric member (17) is arranged on the pivot axle (16).

5. A handle assembly as set forth in claim 4, wherein the connecting member (13) has two different, opposite recessed support positions (18, 19) for the pivot axle (16) connected by a displacement slot, with at least one (19) of the support positions being provided within a cross-section of the guide opening (14).

6. A handle assembly as set forth in claim 2, wherein the hook (12) has an outer surface (21) provided with a cavity-shaped depression (22) extending from the adjoining connecting member (13) along a larger portion of a longitudinal extent of the hook (12).

7. A handle assembly, as set forth in claim 2, wherein groove-shaped depressions (23) are provided on an inner surface of the hook (12) and extend substantially transverse to a longitudinal extent of the hook (12).

8. A handle assembly, as set forth in claim 2, wherein the hook (12) has a variable bearing width.

9. A handle assembly as set forth in claim 3, wherein the connection means (8) is formed by a substantially cylindrical collar (9) which limits the through-bore (4) for the cable (40) and projects from an outer surface of the handle (1).

10. A handle assembly as set forth in claim 9, wherein a plurality of depressions (10) are provided on an outer side of the collar (9) along a circumference thereof for formlockingly receiving the eccentric member (17) of the clamping lever (15).

11. A handle assembly as set forth in claim 10, wherein the depressions (10) are uniformly angularly spaced from each other by an angular distance of one of about 60° and about 90°.

12. A handle assembly as set forth in claim 9, wherein a circular groove is provided on an outer side of the collar (9) for formlockingly receiving the eccentric member (17) of the clamping lever (15).

* * * * *